US009658965B2

(12) United States Patent
Feng et al.

(10) Patent No.: US 9,658,965 B2
(45) Date of Patent: May 23, 2017

(54) CACHE UTILIZATION TO EFFICIENTLY MANAGE A STORAGE SYSTEM

(71) Applicant: International Business Machines Corporation, Armonk, NY (US)

(72) Inventors: Yicheng Feng, Shanghai (CN); Jun Liao, Shanghai (CN); Dan Dan Wang, Shanghai (CN); Ming Jun Xu, Madison, WI (US); Wen Bao Yin, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 14/818,940

(22) Filed: Aug. 5, 2015

(65) Prior Publication Data
US 2016/0092364 A1    Mar. 31, 2016

(30) Foreign Application Priority Data
Sep. 28, 2014   (CN) .......................... 2014 1 0509435

(51) Int. Cl.
*G06F 12/08* (2016.01)
*G06F 12/0871* (2016.01)
*G06F 12/0806* (2016.01)
*G06F 12/0873* (2016.01)

(52) U.S. Cl.
CPC ...... *G06F 12/0871* (2013.01); *G06F 12/0806* (2013.01); *G06F 12/0873* (2013.01)

(58) Field of Classification Search
CPC ............. G06F 12/0871; G06F 12/0806; G06F 12/0873
See application file for complete search history.

(56) References Cited

U.S. PATENT DOCUMENTS

| 7,856,541 | B2 * | 12/2010 | Kaneda | G06F 3/0605 711/100 |
| 8,281,091 | B2 | 10/2012 | Braginsky et al. | |
| 8,380,947 | B2 | 2/2013 | Chiu et al. | |
| 8,589,538 | B2 | 11/2013 | Bargoti et al. | |
| 8,627,015 | B2 | 1/2014 | Durocher et al. | |
| 8,694,749 | B2 | 4/2014 | Yamamoto et al. | |
| 2007/0088930 | A1 * | 4/2007 | Matsuda | G06F 12/0813 711/170 |
| 2007/0124407 | A1 * | 5/2007 | Weber | G06F 3/0607 709/212 |
| 2008/0052456 | A1 * | 2/2008 | Ash | G06F 12/0804 711/113 |
| 2011/0029730 | A1 * | 2/2011 | Durocher | G06F 12/0866 711/114 |
| 2013/0067162 | A1 | 3/2013 | Jayaraman et al. | |

(Continued)

OTHER PUBLICATIONS

Chinese Patent Application Serial No: 201410509435.9, "Management of Storage System", Filed Sep. 28, 2014.

*Primary Examiner* — Ryan Bertram
(74) *Attorney, Agent, or Firm* — Gilbert Harmon, Jr.

(57) ABSTRACT

In an approach for managing a storage system, distribution of storage volumes among a plurality of storage controller groups may be adjusted dynamically or adaptively based on the current access hot degrees of respective storage volumes in the storage system. In this way, optimized distribution of storage volumes can be achieved without user interference. Such redistribution eliminates the degradation of performance of the storage system.

16 Claims, 2 Drawing Sheets

(56) References Cited

U.S. PATENT DOCUMENTS

| | | | |
|---|---|---|---|
| 2013/0174176 A1 | 7/2013 | Kopylovitz | |
| 2013/0204960 A1* | 8/2013 | Ashok | G06F 15/17 709/213 |
| 2014/0181804 A1* | 6/2014 | Sakata | G06F 9/455 718/1 |
| 2014/0359226 A1* | 12/2014 | Pan | G06F 12/0873 711/135 |

* cited by examiner

CACHE UTILIZATION TO EFFICIENTLY MANAGE A STORAGE SYSTEM

BACKGROUND

Embodiments of the present invention relate to a storage system, and more specifically, relate to a method and apparatus for managing a storage system.

In many applications, a host does not directly interact with a low-level storage device such as a disk, but performs data input/output (I/O) access by virtue of storage controllers. The storage controllers are responsible for performing data write and read to the memory device according to instructions from the host. In order to improve fault tolerance and provide other advantages, the storage controllers always work in a unit of a group. One controller group may include two or more controllers and perform operations as a whole. Of course, the storage controllers may also be used individually.

A storage system may comprise a plurality of storage controller groups. I/O access of the host is always performed through a specific storage controller group. Generally, one or more logical and/or physical storage volumes may be created on each physical storage device (e.g., disk). Each storage volume is associated with a storage controller group and controlled thereby. The I/O access by a host to a storage volume is implemented through a storage controller. When the hot degree and frequency of the host accessing to different storage volumes are unbalanced, one or some storage controller groups will have a too heavy work load, while other storage controller groups are in an idle state.

In order to solve this problem, the currently known manner is formulating a storage plan based on a customer's traffic application before the storage system is put into use. In this way, optimized configuration of an association relationship between a storage controller and a storage volume can be determined in advance. However, during an actual use process, the demands and characteristics of the application always vary with time, such that the previous optimized configurations become not suitable anymore. In this case, the customer has to continuously monitor the performance of the storage system to manually adjust allocation of the storage volume between storage controllers, which will increase the customer's operation load, dampen the operation efficiency, and even be unrealized in some cases.

SUMMARY

Generally, embodiments of the present invention provide a technical solution for managing a storage system.

In one aspect, embodiments of the present invention provide a method for managing a storage system, wherein the storage system comprises a plurality of storage controller groups and a plurality of storage volumes, each of the plurality of storage volumes being associated with one of the plurality of storage controller groups. The method comprises: determining cache occupation amounts of the plurality of storage volumes in their respective associated storage controller groups; and generating a redistribution plan of the plurality of storage volumes with respect to the plurality of storage controller groups by: selecting a storage volume, from the plurality of storage volumes, has a higher cache occupation amount but has not been redistributed; determining respective current cache free amount of the plurality of storage controller groups; and selecting a storage controller group that has a higher current cache free amount from the plurality of storage controller groups, to be used for redistribution of the selected storage volume.

In the other aspect, embodiments of the present invention provide an apparatus for managing a storage system, embodiments of the present invention provide an apparatus for managing a storage system, wherein the storage system comprises a plurality of storage controller groups and a plurality of storage volumes, each of the plurality of storage volumes being associated with one of the plurality of storage controller groups. The apparatus comprises: a cache occupation amount determining unit configured to determine cache occupation amounts of the plurality of storage volumes in their respective associated storage controller groups; and a redistribution planning unit configured to generate a redistribution plan of the plurality of storage volumes with respect to the plurality of storage controller groups, comprising: a storage volume selecting unit configured to select a storage volume, from the plurality of storage volumes, has a higher cache occupation amount but has not been redistributed; a current cache free amount determining unit configured to determine respective current cache free amount of the plurality of storage controller groups; and a storage controller group selecting unit configured to select a storage controller group that has a higher current cache free amount from the plurality of storage controller groups, to be used for redistribution of the selected storage volume.

It will be understood through the description below that according to embodiments of the present invention, distribution of storage volumes among a plurality of storage controller groups may be adjusted dynamically or adaptively based on the current access hot degrees of respective storage volumes in a storage system. In this way, optimized distribution of storage volumes may be achieved without user interference. Such redistribution eliminates the degradation of performance of the storage system. Other features and advantages of the present invention will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, same or like reference numerals are used to represent the same or like components.

DETAILED DESCRIPTION

Some preferable embodiments will be described in more detail with reference to the accompanying drawings, where the preferable embodiments of the present disclosure have been illustrated. However, the present disclosure can be implemented in various manners, and thus should not be construed to be limited to the embodiments disclosed herein.

On the contrary, those embodiments are provided for the thorough and complete understanding of the present disclosure, and completely conveying the scope of the present disclosure to those skilled in the art.

Figure 1:
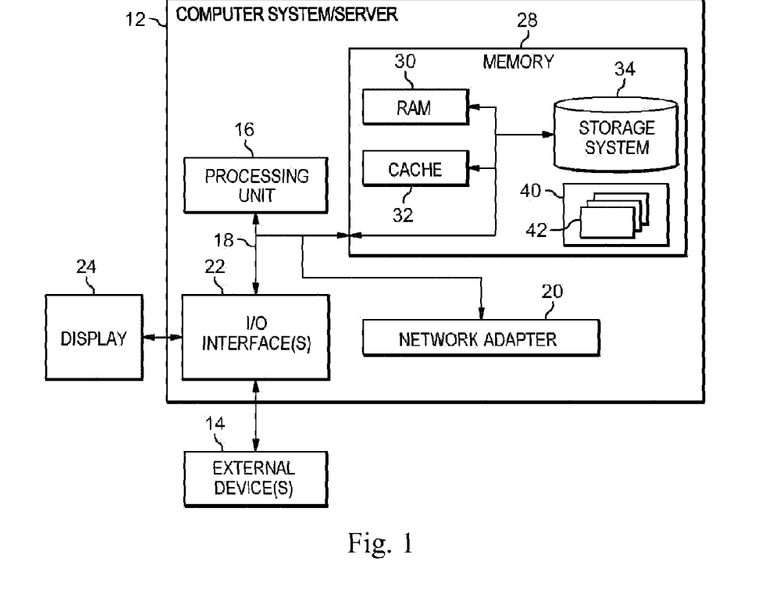
FIG. 1 shows an exemplary computer system/server which is applicable to implement embodiments of the present invention.

Referring now to FIG. 1, where an exemplary computer system/server 12 which is applicable to implement embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more computer processor(s) or processing unit(s) 16, a system memory 28, and a bus 18 that couples various system components including system memory 28 to processor(s) 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
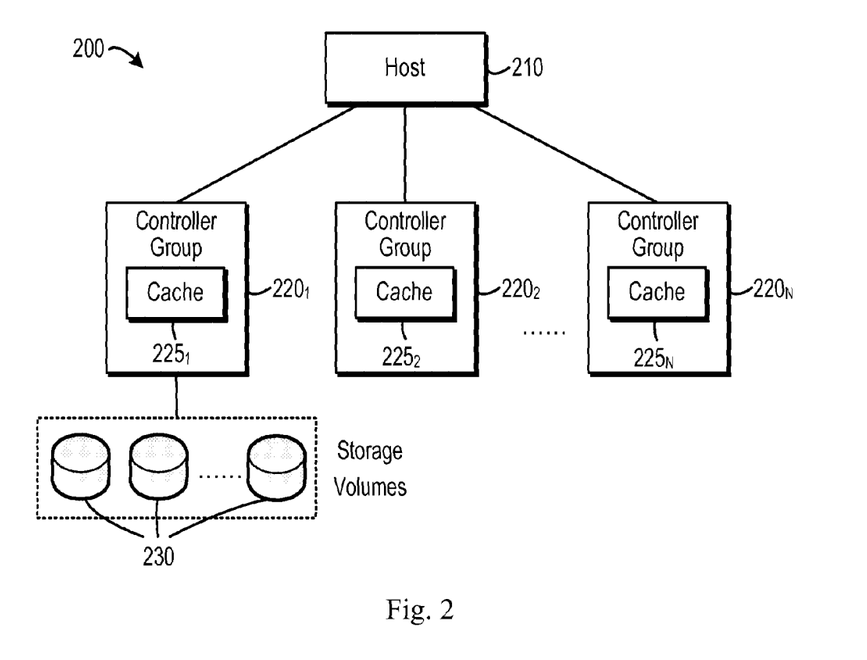
FIG. 2 shows a schematic block diagram of a storage system in which embodiments of the present invention may be implemented.

Hereinafter, embodiments of the present invention will be discussed in detail. FIG. 2 shows an exemplary block diagram of a storage system 200 in which embodiments of the present invention may be implemented. As shown in the figure, the storage system 200 comprises a host 210 and two or more storage controller groups $220_1$, $220_2$, ..., $220_N$ (collectively referred to as "storage controller group 220") associated therewith. The host 210 may be any appropriate machines, e.g., the computer system/server 12 as described with reference to FIG. 1.

Each storage controller group 220 may comprise one or more storage controllers (not shown) to perform corresponding I/O access according to instructions from the host 210. As an example, in one embodiment, the storage controller in the storage controller group 220 may appear in pairs. In other words, in such an embodiment, a storage controller group 220 may comprise two storage controllers to enhance the efficiency, robustness, and fault tolerance of I/O access. Of course, although such practice is beneficial, but not essential. For example, in one embodiment, a single storage controller group 220 may only comprise a storage controller. Any other appropriate number of storage controllers is also possible, and the scope of the present invention is not limited in this aspect.

Each storage controller group 220 is associated with one or more storage volumes 230. For the sake of clarity, FIG. 2 only shows one or more storage volumes 230 associated with the storage controller group $220_1$. The I/O access of the host 210 to the storage volume 230 is performed through a corresponding storage controller group 220. In the context of the present disclosure, the term "storage volume" may refer to a logical volume created through technical means such as virtualization on a physical storage device, or refer to the physical storage device per se. In other words, the storage volume may be a logical volume and/or a physical volume. In particular, in those embodiments where the storage volume 230 comprises a logical volume, a plurality of logical volumes associated with the same storage controller group 220 may be created from the same physical storage device or created from different physical storage devices. In other words, the physical storage device may be shared by a plurality of storage controller groups 220.

As shown in FIG. 2, caches $225_1$ ... $225_N$ (collectively referred to as "cache 225") are provided in the storage controller groups $220_2$ ... $220_N$. For each storage controller group 220, one or more storage volumes 230 associated therewith are allocated with a corresponding cache space in the cache 225. Dependent on the hot degree and frequency of I/O access, features of data, features of storage device, different storage volume 230 associated with the same storage controller group 220 may be allocated with different cache spaces.

Utilization of the cache 225 of the storage controller group 220 is crucial to the performance of the storage system 200. For example, when a given storage controller group 220 receives, from the host 210, an instruction of writing data into the storage volume 230, it is not the case that the storage controller group 220 will wait for the data being actually written into the storage volume 230 before returning a response to the host 210. On the contrary, the storage controller group 220 writes data into a cache space in the cache 225 which is to be allocated to a target storage volume 230. The storage controller group 220 will notify the host 210 that the data write request is successful. Then the storage controller group 220 may de-stage the data into a corresponding storage device at appropriate time.

During operation, when a storage volume 230 has a higher frequency of being accessed, the storage controller group 220 may accordingly increase the cache space in the cache 225 allocated to the storage volume 230. Therefore, if one or more storage volumes 230 associated with one storage controller group 220 are frequently accessed by the host 210, the free space of the cache 225 of the storage controller group 220 will decrease rapidly. When the cache 225 is full, the response delay for the I/O access request will increase significantly. Still with the data write operation as an example, when the cache 225 becomes unavailable, the storage controller group 220 has to first complete actual write of data before returning a response to the host 210. This will degrade the overall performance of the storage system 200.

On the other hand, when the consumption of cache 225 in some storage controller groups 220 is very high, the cache 225 in other storage controller group 220 in the storage system 200 is likely in a relative idle state. Therefore, some storage controller groups 220 become the performance bottleneck of the storage system 200, while the resources in some other storage controller groups 220 are laid idle. This imbalance in resource utilization is disadvantageous.

Figure 3:
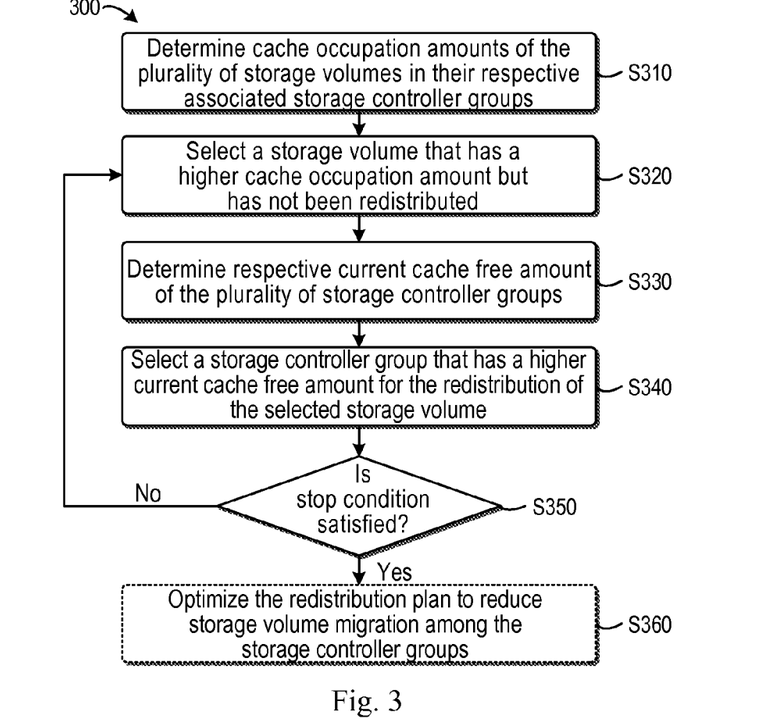
FIG. 3 shows a schematic flow diagram of a method for managing a storage system according to embodiments of the present invention.

In order to reduce or eliminate the above deficiencies, embodiments of the present invention provide a method of managing a storage system comprising a plurality of storage controller groups. FIG. 3 shows a schematic flow diagram of a method 300 for managing a storage system according to one embodiment of the present invention.

The method 300 may be applied to the storage system 200 described with reference to FIG. 2. In general, by performing the method 300, distribution of storage volumes 230 among storage controller groups 220 may be adjusted dynamically and adaptively based on current access hot degree of respective storage volumes 230. In other words, one or more storage volumes 230 may be redistributed to a new storage controller group 220 from the currently associated storage controller group 220. Accordingly, the subsequent I/O access to the redistributed storage volumes 230 will be completed through the new storage controller group 220. Through such dynamic adjustment of the association relationship between the storage controller group 220 and the storage volume 230, degradation of the performance of the storage system 200 may be avoided.

In particular, it would be appreciated through the following description that an objective of the method 300 lies in formulating a re-mobile plan for the storage volumes, rather than actually performing redistribution the storage volumes. In other words, according to embodiments of the present invention, redistribution of the storage volumes may be performed according to an already formulated redistribution plan, and an actual redistribution process may also be performed by other entity. The scope of the present invention is not limited in this aspect.

Specifically, as shown in FIG. 3, the method 300 starts from step S310, where the amount of the cache 225 occupied by the plurality of storage volumes 230 in their respective associated storage controller groups 220 is determined, called "cache occupation amount."

It may be appreciated that for the storage system 200 that is already put into use, each storage volume 230 is associated with a specific storage controller group 220 and is controlled thereby. Such initial association relationship may be determined according to application needs before the storage system 200 is put into use. Alternatively or additionally, such association relationship may also be a result of previous redistribution with respect to the storage volume 230.

In one embodiment, the amount of the cache 225 occupied by each storage volume 230 in the storage controller 220 currently associated therewith may be recorded in a file called "cache profile." For example, in one embodiment, the cache profile may be maintained by the storage controller group 220. Specifically, each storage controller group 220 may maintain a cache profile that records the cache amount in the cache 225 occupied by each storage volume 230 associated with the storage controller group 220. Of course, the cache profile may also be maintained by other appropriate entity.

Next, the method 300 performs steps S320-S350 to determine redistribution of the plurality of storage volumes 230 among the plurality of storage controller groups $220_1 \ldots 220_N$. In other words, through performing steps S320-S350, redistribution plan of the storage volume 230 may be formulated. It should be noted that according to embodiments of the present invention, all storage volumes 230 included in the storage system 200 may be redistributed. Alternatively, the redistribution process may also be performed only for a part of storage volumes 230.

In one embodiment, steps S320-S350 may be iteratively performed for multiple rounds to complete redistribution of the plurality of storage volumes 230. Alternatively, for example, when there is only one or few storage volumes 230 that need redistribution, steps S320-S350 may be only performed once. In the description below, embodiments of steps S320-S350 being iteratively performed will be mainly described to illustrate the idea of the present invention more clearly. However, it should be understood that it is not intended to impose any limitation to the scope of the present invention.

In the context of the present disclosure, "redistribution" of a storage volume refers to re-selecting an associated storage controller group for the storage volume. The re-selected storage controller group may be that storage controller group originally associated with the storage volume. In other words, redistribution does not necessarily lead to migration of the storage volume between different storage controller groups. On the contrary, redistribution of a storage volume may include migrating the storage volume to a new storage controller group or to maintain the current association between the storage volume and the storage controller group unchanged.

In step S320, storage volumes that have a higher cache occupation amount and have not been redistributed are selected according to respective cache occupation amounts of the storage volumes 230 as determined in step S310. For example, in one embodiment, storages that have not been redistributed are selected in a descending order according to the cache occupation amount. Therefore, all storage volumes 230 that have not been redistributed may be ordered according to the cache occupation amount in a descending order. Then in one embodiment, in step S320, the storage volume that has the largest cache occupation amount may be selected from the storage volumes that have not been redistributed.

Alternatively, in one embodiment, the storage volumes 230 are divided into a plurality of groups according to the cache occupation amount in a descending order, and one storage volume is selected from a group having a higher cache occupation amount (e.g., cache occupation amount greater than a predetermined threshold). As an example, the cache occupation amount may be divided into three groups "above 10 G," "5 G-10 G," and "under 5 G." Then, it may be first attempted to select a storage volume from the group "above 10 G." If the "above 10 G" group is empty, it will be attempted to select a storage volume from the group "5 G-10 G," and so forth. In this embodiment, the selected storage volume is not necessarily one having the highest cache occupation amount. For example, the cache occupation amount of the selected storage volume might be secondary high, third high, and etc.

In step S330, respective current cache free amounts of a plurality of storage controller groups 220 are determined. In particular, when the redistribution process is initially started, it may be deemed that no cache 225 in all of the storage controller groups 220 is occupied. In other words, in the first round of iteration, the current cache free amount of each storage controller group 220 has a value equal to the total amount of the cache 225.

The method 300 then proceeds to step S340, where a storage controller group having a higher current cache free amount is selected from a plurality of storage controller groups 220 according to current cache free amounts of respective storage controller groups 220 determined in step S330, for the redistribution of the selected storage volume. For example, in one embodiment, a storage controller group may be selected according to the descending order of the current cache free amounts. To this end, the storage controller groups 220 may be ordered according to the current cache free amounts. In one embodiment, in step S340, the storage controller group having the largest current cache free amount may be selected.

Alternatively, in one embodiment, the storage controller groups 220 may also be divided into a plurality of groups according to the current cache free amounts from a descending order, and one storage controller group is selected from groups having a higher current cache free amounts (e.g., the current cache free amount greater than a predetermined threshold). In such an embodiment, the selected storage controller group does not necessarily have the largest cache free amount. For example, the cache free amount of the selected storage controller group might be the secondary high, the third high, etc.

According to embodiments of the present invention, the storage controller group 220 selected in step S340 will be used for redistribution of the storage volume 230 selected in step S320. In other words, the storage volume 230 selected in step S320 will be redistributed to the storage controller group 220 selected at step S340. In this way, the storage volume that needs to occupy more cache resources and has not been allocated may be redistributed to the storage controller group 220 that currently has a higher current cache free amount.

In particular, when more than one storage controller group 220 has a cache free amount equal in numerical value, in one embodiment, one storage controller group may be randomly selected in step S340.

Alternatively, in another embodiment, a storage controller group may be selected in step S340 such that unnecessary migration of the storage volume is avoided. Specifically, suppose that the first storage controller group $220_1$ and the second storage controller group $220_2$ have the same current cache free amount. If the storage volume 230 selected in step S320 is originally associated with the first storage controller group $220_1$, then in step S340, the first storage controller group $220_1$ may be selected. In this way, by simply maintaining the association relationship between the storage volume 230 and the first storage controller group $220_1$, redistribution of the storage volume 230 is completed. In this manner, unnecessary storage volume migration is avoided.

Alternatively or additionally, when more than one storage controller group 220 has a cache free space equal in numerical value, in step S340, any other tie-breaker mechanism may be employed to perform selection of a storage controller group. For example, selecting a storage control group with a relatively good performance, a storage controller group with a shorter time of being put into use, etc.

Next, the method 300 proceeds to step S350, where it is determined whether a stop condition for redistribution is satisfied. According to embodiments of the present invention, any appropriate redistribution stop condition may be used. For example, in step S350, it may be determined whether all to-be-redistributed storage volumes 230 have been redistributed. If so, the stop condition is satisfied.

Alternatively or additionally, in one embodiment, migration times of a storage volume may be used as a stop condition. Specifically, if a storage volume 230 is still allocated to a storage controller group 220 that is originally associated therewith during the redistribution, it is deemed that the storage volume is not migrated. Otherwise, if the storage volume 230 is redistributed to a new storage controller group 220, it is deemed that migration of the storage volume occurs. An upper threshold for the migration times of a storage volume may be set. When the migration times reaches the threshold, it is deemed that the redistributed stop condition is satisfied. In this way, degradation of the overall performance of the storage system caused by too much storage volume migration may be avoided.

Alternatively or additionally, in one embodiment, a cache free amount of the storage controller group 220 may be used as a stop condition. For example, an average cache free amount of the caches 225 in all storage controller groups 220 may be calculated. If the average cache free amount is higher than a predetermined threshold, it may be deemed that the stop condition is satisfied. Alternatively, in one embodiment, a threshold for an individual cache free amount may also be set. In this case, when some or all of the free cache amounts in the storage controller groups 220 exceed the threshold, the stop condition is satisfied.

In step S350, if it is determined that the stop condition is not satisfied ("no" branch), the method 300 returns to step S330 to start a new round of iteration. It would be appreciated that storage volumes having a higher cache occupation amount have been redistributed through the previous round of iteration, which will therefore be excluded out of the new round of iteration. For example, as mentioned above, in one embodiment, storage volumes having the largest cache occupation amount and having not been redistributed may be selected in step S320. Therefore, the storage volumes having the largest cache occupation amount have been redistributed in the preceding round of iteration, and will not be considered in the present round of iteration. In this way, in the present round of iteration, the storage volumes having the second largest cache occupation amount in the previous round of iteration will be selected and processed. In this way, redistribution plan of the storage volumes may be determined substantially according to the cache occupation amount in a descending order.

Moreover, it would be appreciated that the cache free amount of the storage controller group 220 selected in step S340 in the previous round of iteration will decrease, because the storage volume 230 selected in step S320 will be redistributed to the storage controller group 220, which thereby occupies the cache space in the cache 225. Quantitatively, the margin decreased from the cache free amount of the storage controller group 220 previously selected in step S340 is equal to the cache occupation amount of the storage volume 230 selected in step S320. Therefore, in a new round of iteration, orders of the current cache free amounts of respective storage controller groups 220 might be changed (of course, might also keep unchanged). In this way, it may be guaranteed that a storage volume having a higher cache occupation amount can be redistributed to a storage controller group having a higher cache free amount as much as possible.

On the other hand, if it is determined in step S350 that the stop condition has been satisfied ("yes" branch), it indicates that a redistribution plan for all to-be-processed storage volumes 230 has been generated. In one embodiment, the method 300 may proceed to step S360, where the generated redistribution plan is optimized. It would be appreciated that step S360 is optional (shown in dotted line in the figure). For example, in one embodiment, the generated redistribution plan of the storage volumes may be directly applied, without performing any extra optimization.

Generally speaking, in step S360, the redistribution plan may be adjusted in any appropriate manner to reduce the migration times of the storage volume 230 among the storage controller groups 220 as much as possible.

In one embodiment, cyclic loop removal may be performed to the redistribution plan. In this embodiment, cyclic migration of the storage volume among the plurality of storage controller groups 220 may be avoided. At the ease of discussion, suppose that according to the initial redistribution plan, the first storage volume originally associated with the first storage controller group 220$_1$ will be migrated to the second storage controller group 220$_2$, and a second storage volume originally associated with the second storage controller group 220$_2$ will be migrated to the first storage controller group 220$_1$. Moreover, suppose that the cache occupation amount of the first storage volume is greater than the cache occupation amount of the second storage volume. In this case, according to the initial redistribution plan, a cyclic loop of storage volume migration exists between the first storage controller group 220$_1$ and the second storage controller group 220$_2$.

In one embodiment, the initial redistribution plan may be updated based on a difference between the cache occupation amount of the first storage volume and that of the second storage volume. Specifically, in one embodiment, a third storage volume originally associated with the first storage controller group 220$_1$ may be selected from the plurality of storage volumes 230, such that the cache occupation amount of the third storage volume matches the difference between the cache occupation amount of the first storage volume and that of the second storage volume. In the context of the present disclosure, two numerical values match means that the two are essentially identical. In other words, the difference between the two values is small enough (e.g., less than the predetermined threshold).

If such a third storage volume is found, the redistribution plan may be modified in such a way that the third storage volume is migrated from the first storage controller group 220$_1$ to the second storage controller group 220$_2$. Accordingly, it is unnecessary to migrate the first storage volume and the second storage volume among the first storage controller group 220$_1$ and the second storage controller group 220$_2$. In this way, one migration may be used to equivalently replace two migrations in the initial planning.

For example, in the embodiment described above, suppose that the cache occupation amount of the first storage volume is 1 G, and the cache occupation amount of the second storage volume is 0.6 G. According to the initial redistribution plan, the first storage volume is migrated to the second storage controller group 220$_2$, while the second storage volume is migrated to the first storage controller group 220$_1$. In this way, the actual effect is that the first storage controller group 220$_1$ transfers the cache occupation amount of 1 G–0.6 G=0.4 G to the second storage controller group 220$_2$. If a third storage volume with a cache occupation amount of about 0.4 G is present in the storage volumes associated with the first storage controller 220$_1$, the third storage volume may be directly distributed to the second storage controller group 220$_2$. In this way, the same redistribution effect may be achieved while avoiding unnecessary storage volume migration among the storage controllers.

It is to be understood that although only two storage controller groups are described in the above example, there may be a migration cyclic loop formed by more than two storage controller groups. For a cyclic loop containing any number of storage controller groups, the cyclic loop may be eliminated according to the mechanism as described above, thereby reducing the migration times of the storage volume among the storage controller groups.

Alternatively or additionally, in one embodiment, the optimization in step S360 may comprise a cascade optimization. Specifically, in this embodiment, suppose that according to the initial redistribution plan, the first storage volume originally associated with the first storage controller group 220$_1$ will be migrated to the second storage volume, and the second storage volume originally associated with the second storage controller group 220$_2$ will be migrated to the third storage controller group (e.g., the storage controller group 220$_N$ in FIG. 2).

If the cache occupation amount of the first storage volume matches that of the second storage volume, this cascade migration substantively has no improvement to the cache utilization of the second storage controller group 220$_2$. In this case, in order to avoid potential impact on the system performance caused by unnecessary storage volume migration, in one embodiment, the redistribution plan may be modified such that the first storage volume is directly migrated from the first storage controller group 220$_1$ to the third storage controller group 220$_N$, instead of migrating the second storage volume between the second storage controller group 220$_2$ and the third storage controller group 220$_N$.

For example, suppose that according to the initial redistribution plan, the cache occupation amount of the first storage volume migrated from the first storage controller group 220$_1$ to the second storage controller group 220$_2$ is 1 G, and the cache occupation amount of the second storage volume redistributed from the second storage controller group 220$_2$ to the third storage controller group 220$_N$ is 1 G or about 1 G. At this point, the first storage volume may be directly redistributed from the first storage controller group $220_1$ to the third storage controller group $220_N$, thereby reducing the cache occupation amount of the first storage controller group $220_1$ by 1 G, without bothering to migrate the second storage volume. In this way, the same redistribution effect may be achieved with less storage volume migration.

Alternatively or additionally, in one embodiment, optimization at step S360 may include optimization to reduce storage volume migration among the storage controller groups, based on a sum of the cache occupation amount of the to-be-migrated storage volumes. Specifically, in one embodiment, suppose that according to the initial redistribution plan, the first storage volume and the second storage volume associated with the first storage controller group $220_1$ will be migrated to the second storage controller group $220_2$. In this case, the storage volume associated with the first storage controller group $220_1$ is searched for a third, where the occupation of the third storage volume matches the sum of the cache occupation amounts of the first storage volume and the second storage volume. If such a third storage volume is found, the redistribution plan may be modified such that the third storage volume is migrated to the second storage controller group $220_2$, without migrating the first storage volume and the second storage volume to the second storage controller group $220_2$.

For example, suppose that according to the initial redistribution plan, the cache occupation amounts of the first storage volume and the second storage volume originally migrated from the first storage controller group $220_1$ to the second storage controller group $220_2$ is 1 G and 1.5 G, respectively. At this point, if the cache occupation amount of the third storage volume associated with the first storage controller group $220_1$ is about 2.5 G, then the redistribution plan may be modified in such a way that the third storage volume is migrated from the first storage controller group $220_1$ to the second storage controller group $220_2$ to replace migration of the first and second storage volumes to the second storage controller group $220_2$.

It is to be understood that the optimization process as described above is only exemplary. According to embodiments of the present invention, in step S360, the storage volume migration times among storage controller groups may be reduced in any appropriate manner. The scope of the present invention will not be limited in this aspect.

The method 300 can effectively solve the potential problem of imbalanced utilization of the storage controller groups in a storage system. In this way, it may be avoided that the cache resources in one or more storage controller groups become bottleneck resources, thereby degrading the overall performance of the storage system.

In one embodiment, the method 300 may be initiated manually. For example, an administrator of the storage system may activate the method 300 to redistribute the storage volume among the storage controller groups. Alternatively or additionally, the performance of the storage system may also be automatically monitored, and execution of the method 300 is automatically initiated based on the monitored performance.

Still with reference to the storage system 200 shown in FIG. 2 as an example, in one embodiment, utilization of the cache of at least one storage controller group among a plurality of storage controller groups 220 may be monitored, and automatic execution of the method 300 is triggered based on the monitored cache utilization, to determine the redistribution plan of the storage volumes.

In one embodiment, the timing of triggering redistribution of storage volumes may be determined based on the average cache free amount deviation of respective storage controller groups. The term "average cache free amount deviation" as used herein refers to the amount which measures the degree of deviation of the cache free amounts of different storage controller groups.

The average cache free amount deviation may be calculated in various manners. For example, in one embodiment, respective cache free amounts of a plurality of storage controller groups may be first determined. For the storage controller group 220; (i=1, . . . , N), the amount of free space in the cache 250 is the cache free amount denoted as $C_i$. Based on the cache free amount of respective storage controller groups 220, the average cache free amount of the plurality of storage controller groups 220 may be calculated as:

$$C_{avg} = \frac{1}{N}\sum_{i=1}^{N} C_i$$

Based on the average cache free amount $C_{avg}$, the average cache free amount deviation of a plurality of storage controller groups 220 may be determined as follows:

$$T = \frac{1}{N}\sum_{i=1}^{N} \frac{|C_i - C_{avg}|}{C_{avg}}$$

It would be appreciated that the average cache free amount deviation can reflect the deviation degree of the cache free amounts of different storage controller groups. When the average cache free amount deviation is too large, it means that the free amounts of some storage controller groups in the storage system are apparently greater than the other storage controller groups.

Therefore, in one embodiment, if the average cache free amount deviation exceeds the predetermined threshold, execution of the method 300 may be triggered for redistributing the storage volumes to prevent such storage controller groups from becoming a system bottleneck. The threshold of the average cache free amount deviation may be set to any appropriate value according to the needs. Only as an example, in one embodiment, the threshold may be set to 20%.

Instead of the average cache free amount deviation, any other measurement associated with cache free amount or occupation may be used to trigger the redistribution of the storage volumes. For example, in an alternative embodiment, if a cache free amount of a predetermined number of storage controller groups in the storage system is lower than a predetermined threshold, execution of method 300 is triggered. Any other suitable trigger mechanisms are possible as well.

By automatic triggering and execution of the method 300, distribution of the storage volume among a plurality of storage controller groups may be adaptively distributed based on the actual utilization of the storage system without any artificial intervention. For example, when an access hot degree of the host to a certain storage volume is relatively high, the storage volume may be dynamically redistributed to the storage controller group having a larger cache free amount. In this way, more cache space may be allocated to the storage volume, thereby ensuring quick processing and response to the I/O access.

Figure 4:
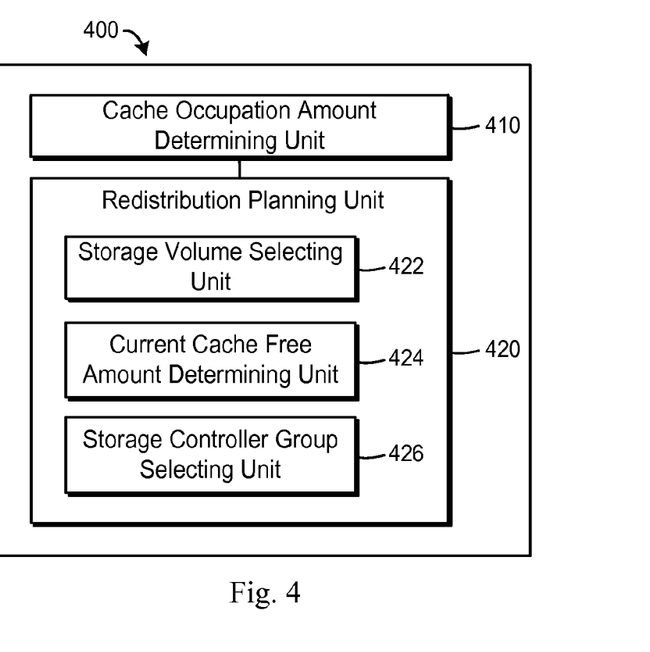
FIG. 4 shows a schematic block diagram of an apparatus for managing a storage system according to embodiments of the present invention.

FIG. 4 shows a block diagram of an apparatus 400 for managing a storage system according to one embodiment of the present invention. As mentioned above, the storage system comprises a plurality of storage controller groups and a plurality of storage volumes, each of the plurality of storage volumes being associated with one of the plurality of storage controller groups.

According to embodiments of the present invention, the apparatus 400 comprises: a cache occupation amount determining unit 410 configured to determine cache occupation amounts of the plurality of storage volumes in their respective associated storage controller groups; and a redistribution planning unit 420 configured to generate a redistribution plan of the plurality of storage volumes with respect to the plurality of storage controller groups, comprising: a storage volume selecting unit 422 configured to select a storage volume, from the plurality of storage volumes, has a higher cache occupation amount but has not been redistributed; a current cache free amount determining unit 424 configured to determine respective current cache free amount of the plurality of storage controller groups; and a storage controller group selecting unit 426 configured to select a storage controller group that has a higher current cache free amount from the plurality of storage controller groups, to be used for redistribution of the selected storage volume.

In one embodiment, the storage volume selecting unit 422 may comprise a storage volume descending order selecting unit configured to select a storage volume that has not been redistributed from the plurality of storage volumes according to the cache occupation amounts in a descending order. In one embodiment, the storage controller group selecting unit 426 may comprise a storage controller group descending order selecting unit configured to select one of the plurality of storage controller groups according to the current cache free amounts in a descending order.

In one embodiment, the storage volume selecting unit 422 may comprise a maximum occupation based selecting unit configured to select from the plurality of storage volumes a storage volume that has the maximum cache occupation amount and has not been redistributed. Accordingly, the storage controller group selecting unit 426 may comprise a maximum free amount based selecting unit configured to select from the plurality of storage controller groups a storage controller group that has the maximum current cache free amount.

In one embodiment, the storage controller group selecting unit 426 may comprise an initial association based selecting unit configured to, in response to that a first storage controller group and a second storage controller group of the plurality of storage controller groups have a same current cache free amount and that the selected storage volume is originally associated with the first storage controller group, select the first storage controller group.

In one embodiment, the apparatus 400 may further comprise a plan optimizing unit configured to optimize the plan of the redistribution to reduce migration of the plurality of storage volumes among the plurality of storage controller groups.

In one embodiment, the plurality of storage controller groups include a first storage controller group and a second storage controller group. The plurality of storage volumes comprise a first storage volume originally associated with the first storage controller group and a second storage volume originally associated with the second controller group. The cache occupation amount of the first storage volume is greater than the cache occupation amount of the second storage volume.

In this embodiment, the plan optimizing unit comprises: a different calculating unit configured to calculate a difference between the cache occupation amount of the first storage volume and the cache occupation amount of the second storage volume in response to the plan indicating that the first storage volume is to be migrated to the second storage controller group and the second storage volume is to be migrated to the first storage controller group; a difference matching unit configured to search the plurality of storage volumes for a third storage volume associated with the first storage controller group, such that the cache occupation amount of the third storage volume matches the difference; and a migration loop optimizing unit configured to, in response to the third storage volume being found, modifying the plan such that the third storage volume is migrated to the second storage controller group, without migrating the first storage volume and the second storage volume between the first storage controller group and the second storage controller group.

In one embodiment, the plurality of storage controller groups include a first storage controller group, a second storage controller group, and a third storage controller group. The plurality of storage volumes include a first storage volume originally associated with the first storage controller group and a second storage volume originally associated with the second storage controller group, the cache occupation amount of the first storage volume matching the cache occupation amount of the second storage volume.

In this embodiment, the plan optimizing unit may comprise a cascade optimizing unit configured to, in response to the plan indicating that the first storage volume is to be migrated to the second storage controller group and the second storage volume is to be migrated to the third storage controller group, modify the plan such that the first storage volume is migrated to the third storage controller group, without migrating the second storage volume to the third storage controller group.

In one embodiment, the plurality of storage controller groups include a first storage controller group and a second storage controller group. The plurality of storage volumes comprise a first storage volume and a second storage volume, which are originally associated with the first storage controller group. In this embodiment, the plan optimizing unit may comprise: a sum matching unit configured to, in response to the plan indicating that the first storage volume and the second storage volume are to be migrated to the second storage controller group, search the plurality of storage volumes for a third storage volume originally associated with the first storage controller group, such that the cache occupation amount of the third storage volume matching a sum of the cache occupation amounts of the first storage volume and the second storage volume; and a sum-based optimizing unit configured to, in response to finding the third storage volume, modify the plan such that the third storage volume migrated to the second storage controller group, without migrating the first storage volume and the second storage volume to the second storage controller group.

In one embodiment, the apparatus 400 may further comprise: a performance monitoring unit configured to monitor cache utilization of at least one storage controller group in the plurality of storage controller groups; and a plan triggering unit configured to trigger the plan of redistribution based on the monitored cache utilization.

For example, in one embodiment, the performance monitoring unit may comprise: a cache free amount determining unit configured to determine respective cache free amounts of the plurality of storage controller groups; an average cache free amount calculating unit configured to calculate an average cache free amount of the plurality of storage controller groups based on the cache free amounts; and a deviation calculating unit configured calculate an average cache free amount deviation of the plurality of storage controller groups based on the cache free amounts and the average cache free amount. In this embodiment, the plan triggering unit may comprise: a deviation-based triggering unit configured to trigger thee plan of the redistribution in response to the average cache free amount deviation exceeding a predetermined threshold.

It should be noted that for the sake of clarity, FIG. 4 does not show optional units or sub-units included in the apparatus 400. All features and operations as described above are suitable for apparatus 400, respectively, which are therefore not detailed here. Moreover, partitioning of units or subunits in apparatus 400 is exemplary, rather than limitative, intended to describe its main functions or operations logically. A function of one unit may be implemented by a plurality of other units; on the contrary, a plurality of units may be implemented by one unit. The scope of the present invention is not limited in this aspect.

Moreover, the units included in the apparatus 400 may be implemented by various manners, including software, hardware, firmware or a random combination thereof. For example, in some embodiments, the apparatus may be implemented by software and/or firmware. Alternatively or additionally, the apparatus 400 may be implemented partially or completely based on hardware. For example, one or more units in the apparatus 400 may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for managing a storage system, the storage system including a plurality of storage controller groups and a plurality of storage volumes, each of the plurality of storage volumes being associated with one of the plurality of storage controller groups, the method comprising:

determining, by a computer processor, one or more cache occupation amounts of the plurality of storage volumes in the respective associated storage controller groups; and generating, by the computer processor, a plan of redistribution of the plurality of storage volumes with respect to the plurality of storage controller groups by:

selecting, by the computer processor, a first one of the plurality of storage volumes which has a higher cache occupation amount than each other of the plurality of storage volumes and has not been redistributed;

determining, by the computer processor, respective one or more current cache free amounts of the plurality of storage controller groups;

selecting, by the computer processor, a first one of the plurality of storage controller groups which has a higher current cache free amount than each other of the plurality of storage controller groups for redistribution of the selected first one storage volume;

optimizing, by the computer processor, a plan of redistribution to reduce migration of the plurality of storage volumes among the plurality of storage controller groups, wherein the plurality of storage controller groups include a first storage controller group and a second storage controller group;

wherein the plurality of storage volumes comprise a first storage volume originally associated with the first storage controller group and a second storage volume originally associated with the second storage controller group, a cache occupation amount of the first storage volume being greater than a cache occupation amount of the second storage volume; and wherein the optimizing the plan of redistribution comprises:

in response to the plan indicating that the first storage volume is to be migrated to the second storage controller group and the second storage volume is to be migrated to the first storage controller group, calculating a difference between the cache occupation amount of the first storage volume and the cache occupation amount of the second storage volume;

searching, by the computer processor, the plurality of storage volumes for a third storage volume associated with the first storage controller group, such that a cache occupation amount of the third storage volume matches the difference; and in response to the third storage volume being found, modifying, by the computer processor, the plan such that the third storage volume is migrated to the second storage controller group, without migrating the first storage volume and the second storage volume between the first storage controller group and the second storage controller group.

2. The method according to claim 1, wherein the selecting the first one of the plurality of storage volumes which has the higher cache occupation amount and has not been redistributed comprises selecting a storage volume that has not been redistributed from the plurality of storage volumes according to the one or more cache occupation amounts in a descending order, and wherein the selecting the first one of the plurality of storage controller groups which has the higher current cache free amount comprises: selecting one of the plurality of storage controller groups according to the one or more current cache free amounts in a descending order.

3. The method according to claim 1, wherein the selecting the first one of the plurality of storage volumes which has the higher cache occupation amount and has not been redistributed comprises selecting from the plurality of storage volumes a storage volume that has a maximum cache occupation amount and has not been redistributed, and wherein the selecting the first one of the plurality of storage controller groups which has the higher current cache free amount comprises selecting from the plurality of storage controller groups a storage controller group that has a maximum current cache free amount.

4. The method according to claim 1, wherein the selecting the first one of the plurality of storage controller groups which has the higher current cache free amount comprises:

in response to that a first storage controller group and a second storage controller group of the plurality of storage controller groups have a same current cache free amount and that the selected storage volume is originally associated with the first storage controller group, selecting the first storage controller group.

5. The method according to claim 1, wherein the plurality of storage controller groups include a first storage controller group, a second storage controller group and a third storage controller group;

wherein the plurality of storage volumes include a first storage volume originally associated with the first storage controller group and a second storage volume originally associated with the second storage controller group, a cache occupation amount of the first storage volume matching a cache occupation amount of the second storage volume; and wherein the optimizing the plan of redistribution comprises:

in response to the plan indicating that the first storage volume is to be migrated to the second storage controller group and the second storage volume is to be migrated to the third storage controller group, modifying, by the computer processor, the plan such that the first storage volume is migrated to the third storage controller group, without migrating the second storage volume to the third storage controller group.

6. The method according to claim 1, wherein the plurality of storage controller groups include a first storage controller group and a second storage controller group;

wherein the plurality of storage volumes comprise a first storage volume and a second storage volume which are originally associated with the first storage controller group; and wherein the optimizing the plan of redistribution comprises:

in response to the plan indicating that the first storage volume and the second storage volume are to be migrated to the second storage controller group, searching, by the computer processor, the plurality of storage volumes for a third storage volume originally associated with the first storage controller group, such that a cache occupation amount of the third storage volume matching a sum of a cache occupation amount of the first storage volume and the second storage volume; and in response to the third storage volume being found, modifying, by the computer processor, the plan such that the third storage volume migrated to the second storage controller group, without migrating the first storage volume and the second storage volume to the second storage controller group.

7. The method according to claim 1, wherein the generating a plan of redistribution of the plurality of storage volumes with respect to the plurality of storage controller groups comprises:

monitoring, by the computer processor, cache utilization of at least one of the plurality of storage controller groups; and triggering, by the computer processor, the plan of redistribution based on the monitored cache utilization.

8. The method according to claim 7, wherein the monitoring cache utilization of at least one of the plurality of storage controller groups comprises:

determining, by the computer processor, respective one or more cache free amounts of the plurality of storage controller groups;

calculating, by the computer processor, an average cache free amount of the plurality of storage controller groups based on the one or more cache free amounts; and calculating, by the computer processor, an average cache free amount deviation of the plurality of storage controller groups based on the one or more cache free amounts and the average cache free amount, and wherein the triggering the plan of redistribution based on the monitored cache utilization comprises triggering the plan of redistribution in response to the average cache free amount deviation exceeding a predetermined threshold.

9. An apparatus for managing a storage system, the storage system including a plurality of storage controller groups and a plurality of storage volumes, each of the plurality of storage volumes being associated with one of the plurality of storage controller groups, the apparatus comprising:

a cache occupation amount determining unit configured to determine one or more cache occupation amounts of the plurality of storage volumes in the respective associated storage controller groups; and a redistribution planning unit configured to generate a plan of redistribution of the plurality of storage volumes with respect to the plurality of storage controller groups, comprising:

a storage volume selecting unit configured to select a first one of the plurality of storage volumes which has a higher cache occupation amount than each other of the plurality of storage volumes and has not been redistributed;

a current cache free amount determining unit configured to determine respective one or more current cache free amounts of the plurality of storage controller groups;

a storage controller group selecting unit configured to select a first one of the plurality of storage controller groups which has a higher current cache free amount than each other of the plurality of storage controller groups for redistribution of the selected first one storage volume;

a plan optimizing unit configured to optimize the plan of redistribution to reduce migration of the plurality of storage volumes among the plurality of storage controller groups, wherein the plurality of storage controller groups include a first storage controller group and a second storage controller group;

wherein the plurality of storage volumes comprise a first storage volume originally associated with the first storage controller group and a second storage volume originally associated with the second storage controller group, a cache occupation amount of the first storage volume being greater than a cache occupation amount of the second storage volume; and wherein the plan optimizing unit comprises:

a different calculating unit configured to calculate a difference between the cache occupation amount of the first storage volume and the cache occupation amount of the second storage volume in response to the plan indicating that the first storage volume is to be migrated to the second storage controller group and the second storage volume is to be migrated to the first storage controller group;

a difference matching unit configured to search the plurality of storage volumes for a third storage volume associated with the first storage controller group, such that a cache occupation amount of the third storage volume matches the difference; and a migration loop optimizing unit configured to, in response to the third storage volume being found, modifying the plan such that the third storage volume is migrated to the second storage controller group, without migrating the first storage volume and the second storage volume between the first storage controller group and the second storage controller group.

10. The apparatus according to claim 9, wherein the storage volume selecting unit comprises a storage volume descending order selecting unit configured to select a storage volume that has not been redistributed from the plurality of storage volumes according to the one or more cache occupation amounts in a descending order;

and wherein the storage controller group selecting unit comprises a storage controller group descending order selecting unit configured to select one of the plurality of storage controller groups according to the one or more current cache free amounts in a descending order.

11. The apparatus according to claim 9, wherein the storage volume selecting unit comprises a maximum occupation based selecting unit configured to select from the plurality of storage volumes a storage volume that has a maximum cache occupation amount and has not been redistributed;

and wherein the storage controller group selecting unit comprises a maximum free amount based selecting unit configured to select from the plurality of storage controller groups a storage controller group that has a maximum current cache free amount.

12. The apparatus according to claim 9, wherein the storage controller group selecting unit comprises:

an initial association based selecting unit configured to, in response to that a first storage controller group and a second storage controller group of the plurality of storage controller groups have a same current cache free amount and that the selected storage volume is originally associated with the first storage controller group, select the first storage controller group.

13. The apparatus according to claim 9, wherein the plurality of storage controller groups include a first storage controller group, a second storage controller group and a third storage controller group;

wherein the plurality of storage volumes include a first storage volume originally associated with the first storage controller group and a second storage volume originally associated with the second storage controller group, a cache occupation amount of the first storage volume matching a cache occupation amount of the second storage volume; and wherein the plan optimizing unit comprises:

a cascade optimizing unit configured to, in response to the plan indicating that the first storage volume is to be migrated to the second storage controller group and the second storage volume is to be migrated to the third storage controller group, modify the plan such that the first storage volume is migrated to the third storage controller group, without migrating the second storage volume to the third storage controller group.

14. The apparatus according to claim 9, wherein the plurality of storage controller groups include a first storage controller group and a second storage controller group, wherein the plurality of storage volumes comprise a first storage volume and a second storage volume which are originally associated with the first storage controller group; and wherein the plan optimizing unit comprises:

a sum matching unit configured to, in response to the plan indicating that the first storage volume and the second storage volume are to be migrated to the second storage controller group, search the plurality of storage volumes for a third storage volume originally associated with the first storage controller group, such that a cache occupation amount of the third storage volume matching a sum of a cache occupation amount of the first storage volume and the second storage volume; and a sum-based optimizing unit configured to, in response to the third storage volume being found, modify the plan such that the third storage volume migrated to the second storage controller group, without migrating the first storage volume and the second storage volume to the second storage controller group.

15. The apparatus according to claim 9, further comprising:

a performance monitoring unit configured to monitor cache utilization of at least one of the plurality of storage controller groups; and a plan triggering unit configured to trigger the plan of redistribution based on the monitored cache utilization.

16. A computer program product for managing a storage system, the storage system including a plurality of storage controller groups and a plurality of storage volumes, each of the plurality of storage volumes being associated with one of the plurality of storage controller groups, the computer program product comprising:

a computer readable storage medium having program instructions stored thereon, wherein the computer readable storage medium is not a transitory signal per se, the program instructions executable by a computer processor to cause the computer processor to perform a method comprising:

determining, by the computer processor, one or more cache occupation amounts of the plurality of storage volumes in the respective associated storage controller groups; and generating, by the computer processor, a plan of redistribution of the plurality of storage volumes with respect to the plurality of storage controller groups by:

selecting, by the computer processor, a first one of the plurality of storage volumes which has a higher cache occupation amount than each other of the plurality of storage volumes and has not been redistributed;

determining, by the computer processor, respective one or more current cache free amounts of the plurality of storage controller groups;

selecting, by the computer processor, a first one of the plurality of storage controller groups which has a higher current cache free amount than each other of the plurality of storage controller groups for redistribution of the selected storage volume;

optimizing, by the computer processor, a plan of redistribution to reduce migration of the plurality of storage volumes among the plurality of storage controller groups, wherein the plurality of storage controller groups include a first storage controller group and a second storage controller group;

wherein the plurality of storage volumes comprise a first storage volume originally associated with the first storage controller group and a second storage volume originally associated with the second storage controller group, a cache occupation amount of the first storage volume being greater than a cache occupation amount of the second storage volume; and wherein the optimizing the plan of redistribution comprises:

in response to the plan indicating that the first storage volume is to be migrated to the second storage controller group and the second storage volume is to be migrated to the first storage controller group, calculating a difference between the cache occupation amount of the first storage volume and the cache occupation amount of the second storage volume;

searching, by the computer processor, the plurality of storage volumes for a third storage volume associated with the first storage controller group, such that a cache occupation amount of the third storage volume matches the difference; and in response to the third storage volume being found, modifying, by the computer processor, the plan such that the third storage volume is migrated to the second storage controller group, without migrating the first storage volume and the second storage volume between the first storage controller group and the second storage controller group.

* * * * *